(12) United States Patent
Deng et al.

(10) Patent No.: US 9,067,555 B1
(45) Date of Patent: Jun. 30, 2015

(54) SIDE IMPACT VEHICLE RESTRAINT DEPLOYMENT

(71) Applicant: Ford Global Technologies, LLC, Dearborn, MI (US)

(72) Inventors: Zhibing Deng, Northville, MI (US); Senthilkumar Mahadevan, Sterling Heights, MI (US); Joseph Edward Abramczyk, Farmington Hills, MI (US); David James Bauch, South Lyon, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/301,442

(22) Filed: Jun. 11, 2014

(51) Int. Cl.
*B60R 21/017* (2006.01)
*B60R 21/013* (2006.01)
*B60R 21/232* (2011.01)
*B60R 22/195* (2006.01)
*B60R 21/00* (2006.01)
*B60R 21/01* (2006.01)

(52) U.S. Cl.
CPC ............ *B60R 21/017* (2013.01); *B60R 21/013* (2013.01); *B60R 21/232* (2013.01); *B60R 22/195* (2013.01); *B60R 2021/0004* (2013.01); *B60R 2021/0006* (2013.01); *B60R 2021/01231* (2013.01); *B60R 2021/01272* (2013.01); *B60R 2021/01034* (2013.01)

(58) Field of Classification Search
CPC ................... B60R 21/23138; B60R 21/0132; B60R 21/013; B60R 21/015; B60R 21/232; B60R 21/01322; B60R 2021/01231; B60R 22/48
USPC .................. 280/735, 730.2, 806; 180/268
See application file for complete search history.

(56) References Cited

U.S. PATENT DOCUMENTS

| 6,241,280 | B1 * | 6/2001 | Biewendt et al. | 280/735 |
|---|---|---|---|---|
| 8,820,462 | B2 * | 9/2014 | Togawa et al. | 180/268 |
| 2001/0038202 | A1 * | 11/2001 | Tobaru et al. | 280/805 |
| 2001/0054816 | A1 * | 12/2001 | Brambilla et al. | 280/806 |
| 2002/0175507 | A1 * | 11/2002 | Kobayashi et al. | 280/735 |
| 2006/0196715 | A1 * | 9/2006 | Fujishiro et al. | 180/271 |
| 2007/0017726 | A1 * | 1/2007 | Takemura | 180/268 |
| 2011/0106383 | A1 * | 5/2011 | Cluff et al. | 701/45 |
| 2012/0065843 | A1 * | 3/2012 | Thomas et al. | 701/45 |
| 2014/0062070 | A1 * | 3/2014 | Togawa et al. | 280/730.2 |

\* cited by examiner

*Primary Examiner* — Drew Brown
(74) *Attorney, Agent, or Firm* — Frank MacKenzie; Bejin Bieneman PLC

(57) ABSTRACT

A vehicle system includes at least one sensor configured to detect an impact and a restraint device configured to deploy in response to the impact. A processing device is configured to deploy the restraint device in accordance with a first timing if the impact includes a front impact and a second timing if the impact includes a side impact. The second timing includes the first timing delayed by a predetermined value.

20 Claims, 2 Drawing Sheets

SIDE IMPACT VEHICLE RESTRAINT DEPLOYMENT

BACKGROUND

Automobiles are often given safety ratings to provide consumers with safety information. In the United States, the National Highway Traffic Safety Administration (NHTSA) developed the New Car Assessment Program (NCAP) for testing vehicles for safety. Tests performed by the NHTSA include a frontal crash test, a side barrier crash test, and a side pole crash test. The test results are compared to the average fleet vehicle. A higher rating is given when the risk of injury is lower than average, and a lower rating is given when the risk of injury is higher than average.

DETAILED DESCRIPTION

An example vehicle includes at least one sensor configured to detect an impact and a restraint device configured to deploy in response to the impact. A processing device is configured to control when the restraint device is deployed. For instance, the restraint device is in accordance with a first timing if the impact is a front impact and a second timing if the impact includes a side impact. The second timing is the first timing delayed by a predetermined value. During side impacts, different restraint devices may be delayed by different values. For example, a side airbag, a side air curtain, and a retractor pretensioner may be deployed after a first predetermined value while an anchor pretensioner and a buckle pretensioner may be deployed after a second predetermined value.

With the restraint deployment system described below, the vehicle may deploy restraint devices in a manner that minimizes the occupant's rib deflection during side impacts. Lateral stiffness of the ribs increases when the rib cage is compressed in the longitudinal direction. Simply deploying seatbelt pretension devices, such as the retractor pretensioner, the anchor pretensioner, and the buckle pretensioner, compresses the rib cage longitudinally. As a result, the lateral resistance to deflection of the rib cage can be increased during side impacts. Rib cage stiffness is also a function of the amount of rib deflection. Therefore, deploying certain restraint devices according to the timing schemes discussed above, and in particular the second timing scheme following a side impact, reduces the rib deflection.

The elements shown in the FIGS. may take many different forms and include multiple and/or alternate components and facilities. The example components illustrated are not intended to be limiting. Indeed, additional or alternative components and/or implementations may be used.

Figure 1:
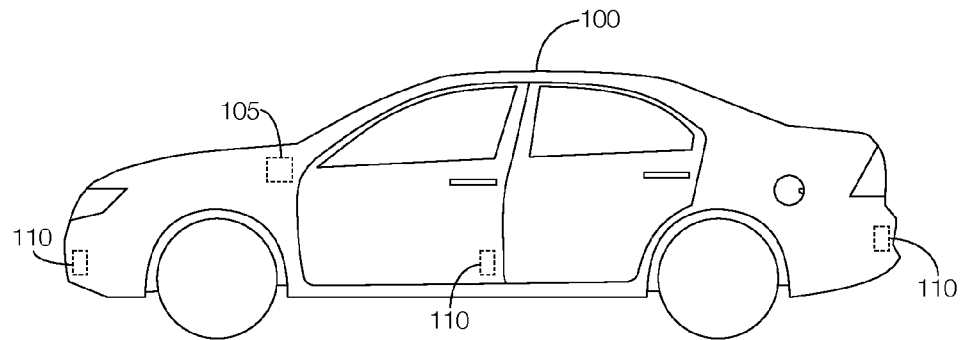
FIG. 1 illustrates an example vehicle that deploys restraints during a side impact according to different timings than during a front impact.

As illustrated in FIG. 1, the vehicle 100 includes a restraint deployment system 105. The restraint deployment system 105, as discussed in greater detail below, is configured to deploy restraints according to different timings based on the type of impact. Sensors 110 may be used to detect whether the impact is a front impact, a side impact, or both. During a front impact, the restraint deployment system 105 may deploy the restraints, which may include airbags, air curtains, pretensioners, etc., in accordance with a "time-to-fire" (TTF) value. The time-to-fire value may define when, in relation to the detection of the impact, the restraints are to be deployed. During a side impact, however, the restraint deployment system 105 may deploy the restraints in accordance with the time-to-fire value delayed by a predetermined value. The predetermined value may be a set value for each of the restraints. Alternatively, the predetermined value may change according to various factors. For instance, the predetermined value may be based on, e.g., the severity of the impact relative to a predetermined threshold. Alternatively, the predetermined value may be based on a gap between an occupant and the vehicle trims as determined by, e.g., a camera with a view of the passenger compartment.

As discussed in greater detail below, the deployment of certain restraints (e.g., side airbags, side air curtains, retractor pretensioners, anchor pretensioners, buckle pretensioners, etc.) may be delayed, relative to the time-to-fire, to reduce rib deflections during the impact. For instance, the delay may be optimized to minimize the occupant's rib deflection during side impacts. Such delays may be up to approximately 25 ms from the time-to-fire. Some restraints may be delayed relative to other restraints. For example, the side airbags, side air curtains, and retractor pretensioners may be deployed at one time relative to the time-to-fire, and other restraints, such as the anchor pretensioners and buckle pretensioners, may be deployed at a later time. In one possible approach, the anchor pretensioners and buckle pretensioners may be delayed approximately 9 ms relative to the deployment of the side airbags, side air curtains, retractor pretensioners, and possibly other restraints.

Although illustrated as a sedan, the vehicle 100 may include any passenger or commercial vehicle such as a car, a truck, a sport utility vehicle, a taxi, a bus, etc. In some possible approaches, the vehicle 100 is an autonomous vehicle configured to operate in an autonomous (e.g., driverless) mode, a partially autonomous mode, and/or a non-autonomous mode.

Figure 2:
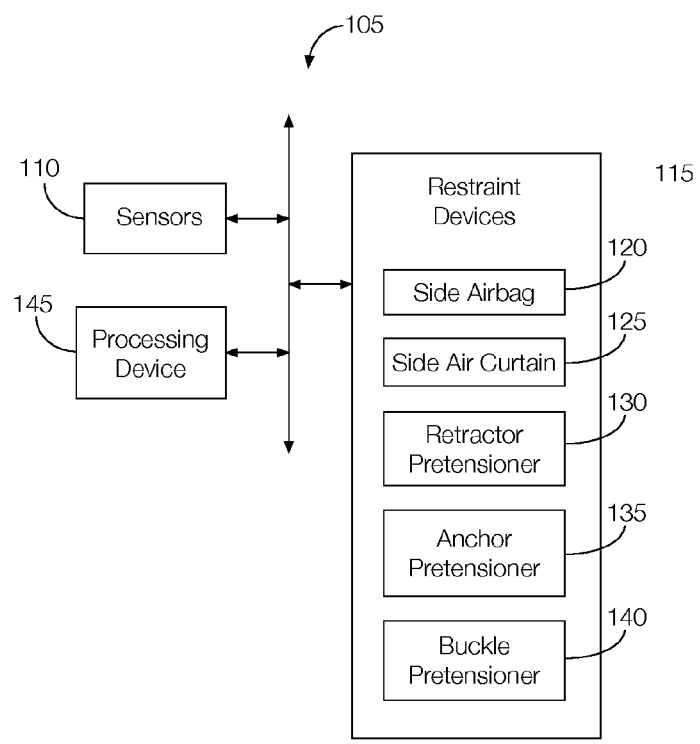
FIG. 2 is a block diagram of an example system incorporated into the vehicle of FIG. 1.

FIG. 2 is a block diagram of an example restraint deployment system 105. As shown, the restraint deployment system 105 includes multiple restraint devices 115, including a side airbag 120, a side air curtain 125, a refractor pretensioner 130, an anchor pretensioner 135, and a buckle pretensioner 140. The restraint deployment system 105 further includes a processing device 145. The restraint deployment system 105 may receive signals output by one or more sensors 110 located throughout the vehicle 100. The signals output by the sensors 110 may indicate a detected impact such as a front impact, a side impact, or both.

The processing device 145 may be configured to deploy the restraint devices 115 according to timings associated with the type of impact. A first timing scheme may be employed during a front impact and a second timing scheme may be employed during a side impact. The second timing scheme may be based on the first timing scheme. For instance, under the second timing scheme, the restraint devices 115 may be deployed under the same timing (i.e., the time-to-fire) as the first timing scheme but delayed by one or more predetermined values. The predetermined values may be the same or different for various restraint devices 115. That is, the side airbag 120, the side curtain, and the retractor pretensioner 130 may be deployed according to one predetermined value and the anchor pretensioner 135 and the buckle pretensioner 140 may be deployed according to another predetermined value. Alternatively, different predetermined values may apply to the side airbags 120, the side air curtains 125, the retractor pretensioner 130, the anchor pretensioner 135, and the buckle pretensioner 140.

The processing device 145 may be configured to detect an impact based on signals output by the sensors 110. For instance, the processing device 145 may be configured to process the signals and determine, from the processed signals, whether the impact includes a front impact, a side impact, or both. Moreover, as discussed above, the processing device 145 may be configured to deploy the restraint devices 115 in accordance with the type of impact detected. Deploying the restraint devices 115 may include the processing device 145 outputting a command signal to one or more restraint devices 115 at various times (e.g., the time-to-fire delayed by one or more predetermined values). The restraint device may deploy in response to receiving the command signal directly or indirectly from the processing device 145.

Figure 3:
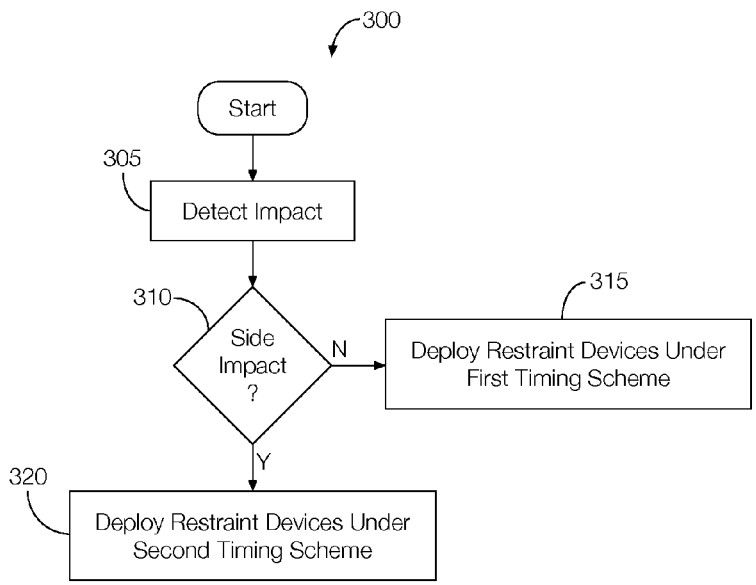
FIG. 3 is a flowchart of an example process that may be implemented by the system of FIG. 2.

FIG. 3 is a flowchart of an example process 300 that may be implemented by the restraint deployment system 105. For example, the process 300 may be executed by the processing device 145.

At block 305, the processing device 145 may detect an impact. The impact may be detected from signals output by the sensors 110 located throughout the vehicle 100. The processing device 145 may be configured to process the signals. From the processed signals, the processing device 145 may determine whether the impact is a front impact, a side impact, or both, as discussed below.

At decision block 310, the processing device 145 may determine whether the impact includes a side impact. If only a front or rear impact is detected, the process 300 may continue at block 315. If a side impact is detected, the process 300 may continue at block 320.

At block 315, the processing device 145 may deploy the restraint devices 115 in accordance with a first timing scheme. That is, the processing device 145 may deploy one or more restraint devices 115 at the time-to-fire, and other restraint devices 115 after a delay. For instance, the processing device 145, in accordance with the first timing scheme, may deploy the side airbags 120, the side air curtains 125, and the retractor pretensioner 130 at the time-to-fire. In some possible implementations, the processing device 145 may deploy the anchor pretensioner 135 or the buckle pretensioner 140 in accordance with the time-to-fire plus a predetermined delay. The process 300 may end after block 315.

At block 320, the processing device 145 may deploy the restraint devices 115 in accordance with a second timing scheme. In implementing the second timing scheme, the processing device 145 may apply a predetermined delay to each restraint device. For instance, the side airbag 120 may be deployed after the time-to-fire plus a first delay period while the side air curtain 125 may be deployed after the time-to-fire plus a second delay period. The retractor pretensioner 130, the anchor pretensioner 135, and the buckle pretensioner 140 may be subject to other delay periods. The processing device 145, in implementing the second timing scheme, may deploy some restraint devices 115 at the same time. That is, some restraint devices 115 may have the same delay period. For instance, the side airbag 120, the side air curtains 125, and the retractor pretensioner 130 may be deployed after the time-to-fire plus a first delay period while the anchor pretensioner 135 and the buckle pretensioner 140 may be deployed after the time-to-fire plus a second delay period. As discussed above, the delay period may be up to approximately 25 ms, including 9 ms. The process 300 may end after block 320.

Figure 4:
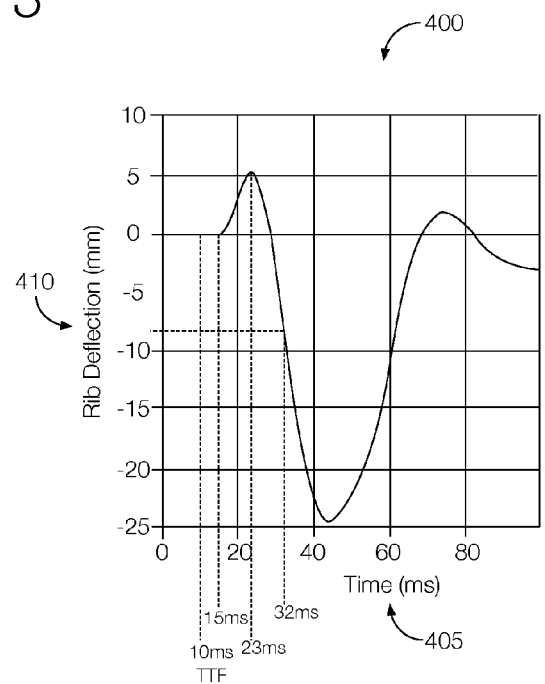
FIG. 4 is an example graph showing a relationship between occupant rib deflection and the deployment of multiple restraint devices at different times.

FIG. 4 is an example graph 400 showing a relationship between occupant rib deflection and the deployment of multiple restraint devices 115 at different times. The x-axis 405 represents time and the y-axis 410 represents occupant rib deflection. In the graph 400, the time-to-fire occurs at 10 ms, which is when the retractor pretensioner 130 is deployed in the example shown in FIG. 4. Rib outboard extension due to, e.g., deployment of the retractor pretensioner 130 at 10 ms has an initial effect at 15 ms and peaks at 23 ms. Compression of the ribs to 8 mm occurs at approximately 32 ms. The anchor pretensioner 135, the buckle pretensioner 140, or both, may be deployed at approximately 19 ms, assuming that the maximum effect of deploying the anchor pretensioner 135 or buckle pretensioner 140 would occur approximately 13 ms after deployment. By delaying the deployment of certain restraint devices 115 to various times, the lateral stiffness of the occupants ribs may be increased, resulting in an overall decrease in rib deflection and compression during the impact.

Accordingly, with the restraint deployment system 105, the vehicle 100 may deploy restraint devices 115 in a manner that minimizes rib deflection during side impact events. Lateral stiffness of the ribs increases when the rib cage is compressed in the longitudinal direction. Deploying seatbelt pretension devices, such as the refractor pretensioner 130, the anchor pretensioner 135, and the buckle pretensioner 140, compresses the rib cage longitudinally. As a result, the resistance of the rib cage increases during side impacts. Rib cage stiffness is further a function of the amount of rib deflection. Therefore, deploying certain restraint devices 115 according to the timing schemes discussed above, and in particular the second timing scheme following a side impact, reduces the rib deflection.

In general, computing systems and/or devices described above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   at least one sensor configured to detect an impact;
   a plurality of restraint devices configured to deploy in response to the impact, the at least one restraint device including a side airbag and a pretensioner; and
   a processing device configured to deploy the plurality of restraint devices in accordance with a first timing scheme if the impact includes a front impact and a second timing scheme if the impact includes a side impact, wherein the first timing scheme includes deploying the side airbag and the pretensioner at a time-to-fire and wherein under the second timing scheme both the side airbag and the pretensioner are delayed by at least one predetermined value relative to the time-to-fire, wherein the predetermined value is based at least in part on an amount of time associated with increasing lateral stiffness of an occupant's ribs.

2. The vehicle system of claim 1, wherein the predetermined value includes a first predetermined value and wherein the side airbag is delayed by the first predetermined value under the second timing scheme.

3. The vehicle system of claim 2, wherein the restraint device includes a side air curtain and wherein the predetermined value includes a second predetermined value, wherein the side air curtain is delayed by the second predetermined value under the second timing scheme.

4. The vehicle system of claim 3, wherein the predetermined value includes a third predetermined value and wherein the pretensioner is delayed by the third predetermined value under the second timing scheme.

5. The vehicle system of claim 4, wherein the pretensioner includes at least one of a retractor pretensioner, an anchor pretensioner, and a buckle pretensioner.

6. The vehicle system of claim 5, wherein the predetermined value for the retractor pretensioner is the third predetermined value, and wherein the predetermined value for at least one of the anchor pretensioner and the buckle pretensioner is a fourth predetermined value.

7. The vehicle system of claim 1, wherein the predetermined value is based at least in part on an amount of time associated with minimizing occupant rib deflection during the impact.

8. The vehicle system of claim 1, wherein the predetermined value includes a delay of up to approximately 25 ms.

9. The vehicle system of claim 1, wherein the predetermined value is based at least in part on increasing lateral stiffness of the occupant's ribs for at least 30 ms after the side impact is detected.

10. The vehicle system of claim 1, wherein the predetermined value is based at least in part on an amount of time for the restraint device to take an initial effect and have a peak effect on the occupant.

11. A vehicle system comprising:
at least one sensor configured to detect a side impact;
a first restraint device configured to deploy in response to the side impact in accordance with a first timing;
a second restraint device configured to deploy in response to the side impact in accordance with a second timing, wherein the second timing includes the first timing delayed by a predetermined value based at least in part on an amount of time associated with increasing lateral stiffness of an occupant's ribs.

12. The vehicle system of claim 11, wherein the first restraint device includes at least one of a side airbag, a side air curtain, and a retractor pretensioner.

13. The vehicle system of claim 11, wherein the second restraint device includes at least one of an anchor pretensioner and a buckle pretensioner.

14. The vehicle system of claim 11, wherein the predetermined value is based at least in part on minimizing occupant rib deflection during the impact.

15. The vehicle system of claim 11, wherein the predetermined value includes a delay of up to approximately 25 ms.

16. The vehicle system of claim 11, wherein the predetermined value is based at least in part on increasing lateral stiffness of the occupant's ribs for at least 30 ms after the side impact is detected.

17. A method comprising:
detecting an impact;
determining whether the impact includes a side impact;
deploying a plurality of restraint devices, including a side airbag and a pretensioner, according to a first timing scheme if the impact does not include the side impact and according to a second timing scheme if the impact includes the side impact, wherein in accordance with the second timing scheme, deployment of the side airbag and the pretensioner is delayed by at least one predetermined value based at least in part on an amount of time associated with increasing lateral stiffness of an occupant's ribs.

18. The method of claim 17, wherein the predetermined value includes a delay of up to approximately 25 ms.

19. The method of claim 17, wherein the at least one predetermined value includes a first predetermined value and a second predetermined value, wherein deploying the plurality of restraint devices includes:
deploying the side airbag after detecting the side impact according to the second timing scheme in accordance with the first predetermined value; and
deploying the pretensioner after detecting the side impact according to the second timing scheme in accordance with the second predetermined value.

20. The method of claim 17, wherein the predetermined value is based at least in part on increasing lateral stiffness of the occupant's ribs for at least 30 ms after the side impact is detected.

* * * * *